United States Patent [19]

Kappler et al.

[11] Patent Number: 5,136,001
[45] Date of Patent: Aug. 4, 1992

[54] HARDENABLE FLUORINATED COPOLYMER, THE PROCESS FOR MAKING THE SAME, AND ITS APPLICATION IN PAINTS AND VARNISHES

[75] Inventors: Patrick Kappler, Ecully; Jean-Luc Perillon, Bernay, both of France

[73] Assignee: Atochem, Puteaux, France

[21] Appl. No.: 779,017

[22] Filed: Oct. 18, 1991

[30] Foreign Application Priority Data

Oct. 19, 1990 [FR] France .................. 90 12970

[51] Int. Cl.$^5$ .................................. C08F 18/20
[52] U.S. Cl. .......................... 526/245; 526/247
[58] Field of Search ........................ 526/245, 247

[56] References Cited

U.S. PATENT DOCUMENTS

| 4,345,057 | 8/1982 | Yawabe et al. | 526/247 |
| 4,931,505 | 6/1990 | Miyazaki et al. | 525/155 |
| 4,960,827 | 10/1990 | Miyazaki et al. | 525/131 |

FOREIGN PATENT DOCUMENTS

| 186186 | 7/1986 | European Pat. Off. |
| 311052 | 4/1989 | European Pat. Off. |
| 2488260 | 2/1982 | France |

Primary Examiner—Joseph L. Schofer
Assistant Examiner—N. Sarofim

[57] ABSTRACT

A hardenable copolymer containing copolymerization molecular constituents from a fluorinated monomer and from an allylic monomer, characterized in that:

(a) the fluorinated monomer molecular constituents orignate from the combination of tetrafluoroethylene and at least one other fluorinated monomer selected from chlorotrifluorethylene, vinylidene fluoride, or a mixture thereof, (b) the allylic monomer is an allylic polyol of formula:

$$CH_2=CH-CH_2-O-CH_2-\underset{\underset{R_2}{|}}{\overset{\overset{R_1}{|}}{C}}-CH_2-R_3$$

in which $R_1$ is H or $CH_2OH$,
$R_2$ is OH or $CH_2OH$, and
$R_3$ is $CH_3$ or OH, with the proviso that $R_1$ and $R_3$ cannot be simultaneously H and $CH_3$, and that it contains:

(c) molecular constituents from an allylic or acryllic monomer with a fluorocarbon chain of formula:

$$CH_2=\underset{\underset{R_4}{|}}{C}-X-C_2H_4-(CF_2)_n-CF_3$$

in which n has a value of 3 to 12,
$R_4$ is H or $CH_3$, and $$X \text{ is } CH_2-O \text{ or } \underset{\underset{O}{||}}{C}-O$$

and the process of making such copolymer and paints and varnishes containing the same.

10 Claims, No Drawings

HARDENABLE FLUORINATED COPOLYMER, THE PROCESS FOR MAKING THE SAME, AND ITS APPLICATION IN PAINTS AND VARNISHES

BACKGROUND OF THE INVENTION

The present invention pertains to a hardenable copolymer of tetrafluoroethylene ($C_2F_4$), at least one other monomer selected from chlorotrifluoroethylene ($C_2F_3Cl$) or vinylidene fluoride ($C_2H_2F_2$), an allylic polyol, and an allylic or acrylic monomer with a fluorocarbon chain. This copolymer is soluble in organic solvents and is particularly recommended for the fabrication of paints and varnishes whose principal properties include resistance to stains and soiling.

The fluorinated polymers are known for their good mechanical properties and their excellent resistance to chemical products and weather. However, their lack of solubility in conventional solvents prevents their use for certain applications such as resin for paints and varnishes where their properties are desired for the production of coatings with good resistance and easy maintenance.

In order to take advantage of the properties of the fluorinated polymers while avoiding their drawbacks, attempts have been make to make them soluble in the conventional organic solvents. In order to accomplish this, it is known to diminish the crystallinity of the fluorinated polymers by copolymerization of ethylenically unsaturated monomers, at least one of which is fluorinated. Because of its low crystallinity, such polymers generally have mediocre mechanical properties and, particularly, poor hardness. For this reason, it is desirable for certain applications, particularly when employing them in the fabrication of paints and varnishes, to preserve a sufficient degree of rigidity and to make them hardenable by incorporating functional groups in their structure.

Such hardenable fluorinated copolymers are described in French Patent No. 2,488,260. They have fluorine atoms at the alpha position of the principal chain which is indispensable for a product with good aging properties. The presence of fluorine atoms at the alpha position of the principal chain also brings to bear an effect of not retaining dust which is manifested by the fact that fluorinated paints soil less quickly then other paints. However, the presence of the fluorine at the alpha position of the principal chain is markedly insufficient to assure, in particular, protection against graffiti in the case of light-colored paints where a "ghost" image of the inscription will always subsist even after cleaning. In attempting to improve this stain-resistance characteristic, many solutions have been envisaged, principally involving the techniques described in the documents below.

In order to prevent coatings from becoming soiled quickly by dust, there is proposed in EP 186,186 a soil-resistant coating characterized by the combination of a fluorinated polymer that has reactive sites with specific fluorcarbon compounds of the type:

or

The addition of these products in small quantities generally does not have a stain-resistant effect. In larger amounts, they limit the cross-linking capability of the film and subsequently lead to the flotation of pigments in the paints and varnishes and thus have a negative impact on the regularity of the colors applied.

In EP 311,052 there is described a soil-resistant coating obtained by combination of a fluorinated polymer and a specific copolymer containing fluorine in the form of a polyfluorocarbon chain and molecular constituents from a hydrophillic monomer. The introduction of this specific copolymer does not have a favorable effect on the aging characteristics of the coating.

SUMMARY OF THE INVENTION

In the present state of the art, the lack of permanence in the stain-resistance property following repeating soilings and cleanings has not been resolved. The present invention provides a solution to this problem.

In addition to this specific property, the fluorinated copolymer in accordance with the invention is easily hardenable in the presence of a hardening agent. This copolymer in solution in a solvent suitable for paint and varnish applications can be used for the formation of coatings that have good adhesion on substrates such as metals, ceramics, wood, plastics or even old coatings.

The hardenable copolymer in accordance with the invention, containing copolymerization molecular constituents from a fluorinated monomer and from an allylic monomer, is characterized in that:

(a) The fluorinated monomer molecular constituents orginate from the combination of tetrafluoroethylene and at least one other fluorinated monomer selected from chlorotrifluoroethylene and vinylidene fluoride, (b) the allylic monomer is an allylic polyol of the formula:

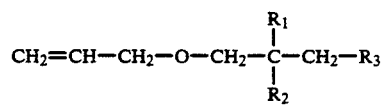

in which $R_1$ is H or $CH_2OH$,
$R_2$ is OH of $CH_2OH$,
$R_3$ is $CH_3$ or OH,
with the proviso that $R_1$ and $R_3$ cannot be simultaneously H and $CH_3$, and that it contains, (c) molecular constituents from an allylic or acrylic monomer with a fluorocarbon chain of formula:

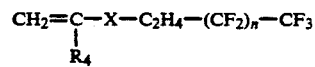

in which n has a value of 3 to 12,
$R_4$ is H or $CH_3$, and

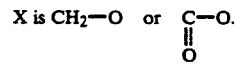

This copolymer can also possibly contain molecular constituents from a nonhydroxylated vinylic ether of formula $CH_2=CH-O-R_5$ in which $R_5$ is a linear or branched chain alkyl radical with 2 to 13 carbon atoms.

The invention also comprises the method of making such copolymer and paints and varnishes containing the same.

DETAILED DESCRIPTION

The composition of the hardenable copolymer defined, per 100 moles of the totality of the copolymerized monomers, is generally the following:

tetrafluoroethylene: 14 to 45 moles,
chlorotrifluoroethylene, vinylidene fluoride or mixture of the two: 25 to 81 moles,
allylic polyol: 4 to 15 moles,
allylic or acrylic fluorocarbon monomer: 1 to 7 moles.

The solubility of the copolymer in the usual solvents for paints and varnishes is affected by the selection of the $C_2F_4$, $C_2H_2F_2$, $C_2F_3Cl$ fluorinated monomer composition. The two monomer composition below are preferentially employed.

The first composition is rich in vinylidene fluoride and characterized by a ratio between the number of moles of $C_2H_2F_2$ and the sum of the moles of $C_2F_4$ and $C_2F_3Cl$ such that:

$$1.5 < \frac{C_2H_2F_2}{C_2F_4 + C_2F_3Cl} < 4$$

The second composition contains less than 20 moles of $C_2H_2F_2$ and is characterized by a ratio between the number of moles of $C_2F_4$ and $C_2F_3Cl$ such that:

$$0.7 < \frac{C_2F_4}{C_2F_3Cl} < 1.5$$

Among the preferred allylic polyols can be cited 3-allyloxyl-1,2-propanediol and trimethylolpropanemonoallyl ether.

Among the preferred allylic or acrylic monomers carrying fluorcarbon chains can be cited the compounds of formula:

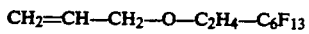

$CH_2=CH-CH_2-O-C_2H_4-C_6F_{13}$

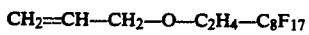

$CH_2=CH-CH_2-O-C_2H_4-C_8F_{17}$

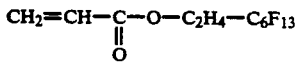

$$CH_2=CH-\underset{O}{\overset{\parallel}{C}}-O-C_2H_4-C_6F_{13}$$

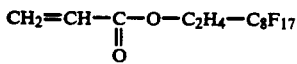

$$CH_2=CH-\underset{O}{\overset{\parallel}{C}}-O-C_2H_4-C_8F_{17}$$

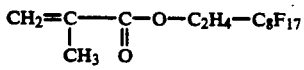

$$CH_2=\underset{CH_3}{\overset{|}{C}}-\underset{O}{\overset{\parallel}{C}}-O-C_2H_4-C_8F_{17}$$

If a vinylic ether is part of the composition of the copolymer, it can be preferably selected from among butylvinyl ether, isobutylvinyl ether, propylvinyl ether and isopropylvinyl ether.

In order to be able to use these copolymers in a liquid coating composition, such as paint or varnish, it is recommended that the inherent viscosity of the copolymer dissolved in dimethylformamide at 25° C. at a concentration of 1 g/dL be between the values of 0.06 and 1 dL/g.

The presence of $C_2F_4$ is indispensable in order to successfully incorporate an allylic polyol in the copolymer chain. If the level is below the stated 14 mole %, the productivity and, in particular, the polymerization kinetics drop accordingly. If the level is higher than the stated 45 mole %, the resultant copolymer exhibits problems of solubility in paint solvents.

The presence of a nonhydroxylated vinylic ether during copolymerization is recommended for improving the solubility of the polymer in relation to conventional solvents. Without having any harmful effects on the properties of the final copolymer, it is possible to introduce into the composition of the hardenable copolymer up to 33 moles of nonhydroxylated vinylic ether per 100 moles of the totality of the basic monomers necessarily entering into the formulation of the said copolymer.

The copolymer in accordance with the invention is usually obtained in accordance with the known solution polymerization procedure. The procedure is comprised of copolymerizing the monomers in a solvent medium in the presence of an organosoluble initiator at a temperature between circa 30° and 120° C., preferably between 40° and 80° C., under a pressure of circa 10 to 80 bars, preferably between 15 and 40 bars.

In accordance with the invention, the cross-linkable copolymer is obtained by copolymerization of tetrafluoroethylene, at least one other fluorinated monomer selected from chlorotrifluoroethylene, vinylidene fluoride, or a mixture thereof and, in accordance with the previous definition, an allylic polyol and an allylic or acrylic monomer with this monomer carrying a fluorocarbon chain. The following are employed per 100 moles of copolymerized monomers:

14 to 45 moles of tetrafluoroethylene,
30 to 81 moles of chlorotrifluoroethylene, vinylidene fluoride, or mixture of the two,
4 to 15 moles of allylic monomer in the form of allylic polyol,
1 to 7 moles of fluorocarbon-chain-carrying allylic or acrylic monomer.

To these 100 moles of monomers it is possible to add a nonhydroxylated vinylic ether, in accordance with the previous definition, in a proportion that can reach up to 33 moles.

In accordance with the preferred copolymerization method, the solvent is heated to the selected reaction temperature in a previously degassed reactor. A mixture of $C_2F_4$ and $C_2F_3Cl$ and/or $C_2H_2F_2$ as well as possibly an initial fraction of the other monomers and of the possibly present nonhydroxylated vinylic ether are introducted into the reactor.

The amount of mixture of monomers to be introduced so as to reach the selected reaction pressure depends on the solubility conditions of $C_2F_4$ and $C_2F_3Cl$ and/or $C_2H_2F_2$ in the selected solvent. The weight ratio of the $C_2F_4$ and $C_2F_3Cl$ and/or $C_2H_2F_2$ mixture to the solvent is generally between 0.1 and 1.

The polymerization initiator is introduced into the reactor when the reaction pressure and reaction temperature have been reached. The formation of polymer is manifested by a drop in pressure which is compensated for by the addition of the $C_2F_4$ and $C_2F_3Cl$ and/or $C_2H_2F_2$ mixture.

It is possible to add a mixture of $C_2F_4$ and $C_2F_3Cl$ and/or $C_2H_2F_2$ of a molar composition identical to that initially introduced.

It is also possible to take into account the inherent reactivities of each monomer and to adjust the composition of the mixture introduced during polymerization so as to create a copolymer which is homogeneous in composition.

The other monomers and the possibly present nonhydroxylated vinyl ether can also be added during polymerization. They can also be added as a mixture or separately, combined or not combined with the additions of $C_2F_4$ and $C_2F_3Cl$ and/or $C_2H_2F_2$. These other monomers and the possibly present nonhydroxylated vinyl ether are preferably added in a manner such that the composition of the mixture of all of the monomers remains constant during the entire duration of the copolymerization.

The addition of the mixture of $C_2F_4$ and $C_2F_3Cl$ and/or $C_2H_2F_2$ so as to maintain the pressure is continued for a sufficiently long period of time to reach a dry extract level on the order of 10 to 60%, preferably 15 to 40%.

The residual volatile reactants can be eliminated by degassing.

The solution extracted from the polymerization reactor can be preserved as it is if the polymerization solvent is suitable for the paint and varnish application. In the contrary case, the solvent can be eliminated by distillation and replaced by a different solvent that is more suitable for the selected type of application. The solution can also undergo washing with water so as to eliminate the water-soluble residues formed during copolymerization since these residues would have a negative impact on storage stability.

The solvents selected for the copolymerization reaction must make it possible to dissolve the mixture of monomers while remaining inert in relation to the other reaction components. The solvents are preferably selected from among the acetates and the alcohols. Among the preferred acetates, butyl acetate, isobutyl acetate and ethyl acetate are particularly recommended. Among the preferred alcohols, n-propanol and tertibutanol can be mentioned.

The copolymerization initiators are known in themselves. They are usually selected from among the radical polymerization initiators such as the predicarbonates, the perpivalates and the azo compounds, such is diisopropyl or dicyclohexyl percarbonate, tertiobutyl or tertioamyl perpivalate, azobisisobuytronitrile and azobis-2,2-dimethylvaleronitrile.

The molecular weights by number ($\overline{Mn}$) of the crosslinkable copolymers obtained are, preferably, between 1,000 and 20,000; they are measured by the steric exclusion chromatographic technique (GPC) after dissolution in dimethylformamide, at room temperature. These GPC measurements are performed on a 3-column WATERS microstyragel apparatus ($10^2$ nm, $10^3$ nm, $10^4$ nm) calibrated with polyethylene glycol standards. Detection is performed with a refractometer.

As such, the copolymer in solvent medium yields a transparent solution. To this solution can be added the desired and conventional coating additives such as pigments, fillers, solvents, diluents, catalysts, rheology modifiers, spreading agents, wetting agents, antifoaming agents, heat- or light-stabilizing agents, adhesion promoters, coresins or cross-linking hardening agents.

The following can be mentioned among the pigments: titanium dioxide, iron oxides, chrome green oxide, cobalt blue, chrome yellow, carbon black or corrosion-inhibiting pigments such as zinc phosphate and aluminum triphosphate.

The following can be mentioned among the solvents or diluents: esters, ketones, propylene glycol ethers and aromatic compounds.

The following can be mentioned among the coresins: acrylic resins, polyesters, polyethers and epoxides. The following can be mentioned among the cross-linking hardening agents: the possibly etherified melamineformaldehydes, the free or blocked isocyanates or polyisocyanates, and the organic acids or polyacids or their anhydrides.

The cross-linking temperature of these copolymers is generally between $-20°$ and $+270°$ C. and is essentially dependent on the nature of the hardening agent.

The cross-linking capacity of these fluorinated functional copolymers is determined by means of a solvent-resistance test. A cotton pad soaked in methyl ethyl ketone (MEK) is rubbed with a back-and-forth movement on the coating until the appearance of the support. A total of more than 50 back-and-forth movements (round trips) indicates good cross-linking; a total of more than 100 back-and-forth movements indicates excellent cross-linking.

The paints or varnishes based on these copolymers can be applied via pneumatic or electrostatic spraying, by dipping, with a brush or with a roller.

The following nonlimitative examples further illustrate the invention.

In these examples, the stain-resistance capability can be evaluated in different manners.

The first method is comprised of measuring the critical surface tensions of the coatings using Zisman's method in which the critical surface tension $\tau_c$ is determined by measuring the angles of contact $\theta$ of a series of liquids with decreasing surface tensions $\tau_L$. Calculating $\cos \theta$ as a function of $\tau_L$, we obtain for $\cos \theta = 1$ the largest value of $\tau_L$ corresponding to the perfect wetting of the coating ($\theta = 0$).

This value also corresponds to the critical surface tension of the coating $\tau_c$. The smaller the value of $\tau_c$, the higher is the stain resistance.

The series includes the following liquids:
(i) freshly prepared (less than 24 hours) twice-distilled water,
(ii) twice-distilled glycerol,
(iii) diiodomethane, and
(iv) benzyl alcohol.

The angles of contact are measured with a Rame-Hart type goniometer.

The second method is comprised of evaluating the stain resistance in relation to standard staining agents.

The coated substrate is stained on a minimum circular surface are of 4 cm$^2$ with the following agents:
(i) KIWI brand black shoe polish,
(ii) PENTEL brand black indelible felt-tip pen, and
(iii) ALTONA brand fluorescent pink graffiti paint.

The stains are cleaned after one week of impregnation. The cleaning operation is performed with a cotton pad soaked in methyl ethyl ketone. The soaked cotton pad is changed as often as necessary so as to be able to absorb the stain. The cleaning operation is considered to be completed when five back-and-forth strokes with a clean cotton pad do not yield any traces of soiling to the naked eye on the cotton pad itself. The traces or "ghost" images of the residual product are evaluated either visually or by spectrocolorimetric measurement of the colorimetric deviation from an unchanged standard.

When the test is performed visually, the trace image is evaluated in the following manner:
0 = no trace of image,
1 = unpigmented image visible at 25 cm, 2=pigmented image not visible at more than 30 cm,
3=pigmented image not visible at more than 2 m, and
4=pigmented image not visible at more than 5 m.

In order to measure the permanence of the stain resistance property, coated test pieces are stained on a circular surface area of 4 cm².

The stained test piece is kept for 3 minutes at room temperature, baked for 3 minutes at 100° C. and then cooled to room temperature.

Cleaning is then performed with a cotton pad soaked in methyl ethyl ketone (MEK). This cotton paid is changed as often as is required to absorb the stain.

The cleaning operation is considered to be completed when five back-and-forth strokes with a clean cotton pad do not yield any traces of soiling to the naked eye on the cotton paid itself.

The trace images of the residual product are evaluated either visually or by spectrocolorimetric measure of the colorimetric deviation from an unchanged standard.

EXAMPLE 1

Into a 3.3-liter autoclave equipped with effective agitation are introduced after degassing under vacuum: 2 liters of tertiobutanol, 30 g of 3-allyloxyl-1,2-propanediol and 10 g of fluorinated monomer of formula $C_8F_{17}C_2H_4$—O—$CH_2$—CH=$CH_2$. The temperature is the autoclave is brought to 70° C. at which temperature is added 215 g of $C_2H_2F_2$, 84 g of $C_2F_4$, and then 5 g of tertiobutyl perpivalate. The pressure is 20 bars.

Copolymerization is manifested by a drop in pressure which is compensated for by the addition of a mixture of $C_2H_2F_2$ and $C_2F_4$ in the molar proportion of 65/35. Each time that 46 g of the aforementioned monomer mixture is introduced, there is also introduced 5.5 g of 3-allyloxy-1,2-propanediol and 1.8 g of the compound of the formula $C_8F_{17}C_2H_4$—O—$CH_2$—CH=$CH_2$. After 3 hours of polymerization, 8 g of tertiobutyl perpivalate is introducted to accelerate the copolymerization kinetics. After 6 hours 10 minutes, a total of 44 g of 3-allyloxy-1,2-propanediol, 14 g of the monomer of formula $C_8F_{17}C_2H_4$—O—$CH_2$—CH=$CH_2$ and 414 g of the 65/35 molar mixture of $C_2H_2F_2/C_2F_4$ monomers have been introduced.

The autoclave is cooled, the residual monomers are degassed and the content of the autoclave is distilled under vacuum. There is recovered 445 g of copolymer which is dissolved in butyl acetate. After washing with water, the copolymer solution is brought to 64.4% of dry extract.

The copolymer is subjected to chemical determination of the hydroxy functions in a pyridine/phthalic anhydride medium. The phthalic anhydride solution is prepared by dissolving 140 g of phthalic anhydride and 1 L of pyridine in a glass flask. One gram of copolymer is introduced into 5 mL of reagent and kept at 95-100° C. for 1 hour. After cooling, the amount of phthalic anhydride that has disappeared is determined. The determination yielded an OH level of 1.70 meq/g (milliequivalent gram).

Fluorine 19 NMR analysis showed the molar composition of the copolymer to be the following:

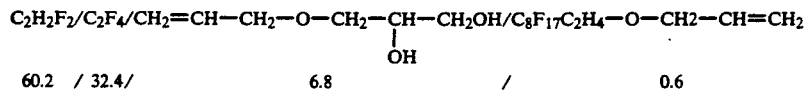

$C_2H_2F_2/C_2F_4/CH_2$=CH—$CH_2$—O—$CH_2$—CH—$CH_2$OH/$C_8F_{17}C_2H_4$—O—CH2—CH=$CH_2$
                                              |
                                              OH 60.2 / 32.4 / 6.8 / 0.6

The inherent viscosity of the copolymer in solution in dimethylformamide at 25° C. at a concentration of 1 g/dL was 0.19 dL/g.

Test 1

One hundred grams of the aforementioned copolymer solution are mixed with 12.5 g of isophorone diisocyanate and 2.3 g of a solution of dibutyltin dilaurate (DBTL) at 10% in butyl acetate. The viscosity is adjusted with 12.5 g of methoxyl propanol acetate.

The resultant varnish is applied with a 100-μm spiral applicator on a 0.7 -mm thick degreased chromated aluminum plate.

The test piece is allowed to dry for 48 hours at room temperature which yields a 30-μm thick dry film. The film underwent without change 100 back-and-forth stokes with methyl ethyl ketone. It exhibited a Persoz hardness of 220s measured according to NFT 30016 and a specular gloss at 60° of 60% measured according to ASTM D 523-85. The critical surface tension was 34 mN/m.

The results of the stain resistance and permanence of effect tests are presented in the following Tables.

Test 2

The ground base is prepared by dispersing for 30 minutes at 1,500 rpm, 120 g of titanium dioxide with 160 g of the aforementioned copolymer solution and 40 g of butyl acetate.

To 160 g of this white ground base are added 20 g of the aforementioned copolymer solution, 21.5 g of a trimer of hexamethylene diisocyanate, 2.6 g of a solution of DBTL at 10% in butyl acetate and 10 g of butyl acetate.

The resultant paint is applied with a 100-μm spiral applicator to a 0.7-mm thick degreased chromated aluminum plate.

The test piece is allowed to dry for 48 hours at room temperature which yields a 28-μm thick dry film. The film underwent without change 100 back-and-forth strokes with MEK. It exhibited a Persoz hardness of 215s measured according to NFT 30016 and a specular gloss at 60° of 43% measured according to ASTM D 523-85.

The critical surface tension was 37 mN/m. The results of the stain resistance and permanence of effect tests are presented in the following tables.

Test 3

Paint identical to that of Test 2 is prepared. Drying is performed by baking the coated plate for 30 minutes at 80° C.

The 28-μm thick dry paint film underwent without change 100 back-and-forth strokes with methyl ethyl ketone. It exhibited a Persoz hardness of 228s measured according to NFT 30016 and a specular gloss at 60° of 46% measured according to ASTM D 523-85. The critical surface tension was 37.7 mN/m. The results of the stain resistance and permanence of effect tests are presented in the following Tables.

EXAMPLE 2

Test 4

A paint is prepared from a commercially available fluorinated copolymer with the following characteristics:

copolymer of chlorotrifluoroethylene and vinylic ethers, molecular weight by number of 20,000, OH index of 32 (mg KOH/g) and transition temperature of 42±2° C., in solution at 60% in xylene.

A pigment base was prepared first by dispersing 118 g of titanium dioxide for 30 minutes at 1,5000 rpm in 196.5 g of the commercially available copolymer.

78.6 g of this base was then deconcentrated with 21.7 g of the commercially available fluorinated copolymer. 7.95 g of a trimer of hexamethylene diisocyanate and 0.2 g of a solution of DBTL at 10% in butyl acetate were then added. The viscosity was adjusted with 19.8 g of butyl acetate. The resultant paint was applied with a 100-μm spiral applicator to a 0.7-mm thick degreased chromated aluminum plate.

The test piece was allowed to dry for 48 hours at room temperature which yielded a 26-μm thick dry film. The film underwent without change 100 back-and-forth strokes with MEK, exhibited a Peroz hardness of 237s measured according to NFT 30016 and a specular gloss at 60° of 78% measured according to ASTM D-523-85.

The critical surface tension was 39.5 mN/m. The results of the stain resistance and permanence of effect tests as presented in the following Tables were limited.

Test 5

The same paint as described in Test 4 was prepared but the coated plate was dried for 30 minutes at 80° C.

The 26-μm thick dry film underwent without change 100 back-and-forth strokes with MEK, exhibited a Persoz hardness of 240s measured according to NFT 30016 and a specular gloss at 60° of 79% measured according to ASTM D 523-85. The critical surface tension was 40 mN/m. The results of the stain resistance and permanence of effect tests as presented in the following Tables were limited.

Test 6

Test pieces as described in Test 4 were prepared.

A fluorinated composition was prepared by mixing 40 g of a commercially available hydroxylated polyfluorinated copolymer (solution at 50% in butyl acetate-viscosity 2,600 mPa/s, 1.3% hydroxyl content), 6 g of trimer of hexamethylene diisocyanate, 352.5 g of methoxy propanol acetate and 0.05 g of a solution of DBTL at 10% in butyl acetate.

The fluorinated composition was applied on the paint of Test 4 with a 30-μm spiral applicator and then allowed to dry for 48 hours at room temperature which yielded a film with a thickness of 4±1 μm.

The critical surface tension was 21 mN/m.

The results of the stain resistance and permanence of effect tests are presented in the following Tables.

Test 7

Test pieces were prepared as in Table 6, but the solution of fluorinated composition was dried in an oven for 30 minutes at 80° C. which yielded a film thickness of 4±1 μm.

The critical surface tension was 20.7 mN/m. The results of the stain resistance and permanence of effect tests are presented in the following Tables.

EXAMPLE 3

Into a 3.3-liter autoclave equipped with effective agitation are introduced after degassing under vacuum: liters of tertiobutanol, 30 g of 3-allyloxy-1,2-propanediol and 30 g of fluorinated monomer of formula:

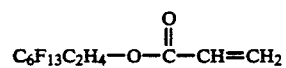

The temperature in the autoclave is brought to 70° C. at which temperature is added 215 g of $C_2H_2F_2$, 84 g of $C_2F_4$ and then 5 g of tertiobutyl perpivalate. The pressure is 20 bars. Copolymerization is manifested by a drop in pressure which is compensated for by the addition of a mixture of $C_2H_2F_2$ and $C_2F_4$ in the molar proportion of 65/35.

Each time that 46 g of the aforementioned monomer mixture is introduced, there is also introduced 5.5 g of 3-allyloxy-1,2-propanediol and 5.5 g of the compound of formula:

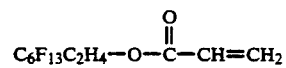

After 3 hours of polymerization, 8 g of tertiobutyl perpivalate is introduced to accelerate the copolymerization kinetics. After 5 hours, a total of 44 g of 3-allyloxy-1,2-propanediol, 44 g of the monomer of formula:

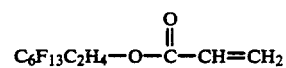

and 414 g of the 65/35 molar mixture of $C_2H_2F_2/C_2F_4$ monomers have been introduced.

The autoclave is cooled, the residual monomers are degassed and the content of the autoclave is distilled under vacuum. There is recovered 485 g of copolymer which is dissolved in butyl acetate. After washing with water, the copolymer solution is brought to 68.9% of dry extract.

The copolymer is subjected to chemical determination of the hydroxy functions in a pyridine/phthalic anhydride medium as described above. The determination yielded on OH level of 1.5 meq/g.

Fluorine 19 NMR analysis showed the molar composition of the copolymer to be the following:

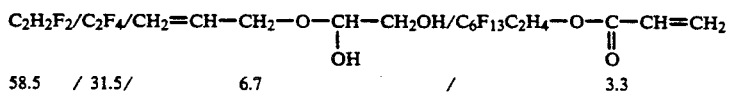

The inherent viscosity of the copolymer in solution in dimethylformamide at 25° C. at a concentration of 1 g/dL was 0.18 dL/g.

Test 8

Two hundred grams of the aforementioned copolymer solution are mixed with 23.9 g of isophorone diisocyanate and 0.90 g of a solution of DBTL at 10% in butyl acetate. The viscosity is adjusted with 27 g of methoxy propanol acetate.

The resultant varnish is applied with a 100-μm spiral applicator on a 0.7-mm thick degreased chromated aluminum plate.

The test piece is allowed to dry for 48 hours at room temperature which yields a 27-μm thick dry film. The film underwent without change 100 back-and-forth strokes with MEK, exhibited a Persoz hardness of 240s measured according to NFT 30016 and a specular gloss at 60° of 53% measured according to ASTM D 523-85. The critical surface tension was 31 mN/m.

The stain resistance is presented in the following Tables.

Test 9

Two hundred grams of the aforementioned copolymer solution are mixed with 40 g of an etherified melamineformaldehyde resin in solution at 90% in isobutanol and 0.25 g of p-toluenesulfonic acid. The viscosity is adjusted with 40 g of propylene glycol diacetate. The resultant varnish is applied with a 100-μm spiral applicator on a 0.8-mm thick degreased galvanized steel plate.

The test piece is dried in an oven at 150° C. for 30 minutes which yields a 22-μm thick dry film. The film underwent without change 100 back-and-forth strokes with MEK, exhibited a specular gloss at 60° of 60% measured according to ASTM D 523-85 and a Persoz hardness of 225s measured according to NFT 30016.

The critical surface tension was 31 mN/m.

The stain resistance is presented in the following Tables.

Test 10

The ground base is prepared by dispersing for 30 minutes at 1,500 rpm, 126 g of titanium dioxide with 160 g of the aforementioned copolymer solution, 28.8 g of butyl acetate and 18 g of methoxy propanol acetate.

To 106.4 g of this white ground base are added 20 g of the aforementioned copolymer solution, 21 g of a trimer of hexamethylene diisocyanate, 0.7 g of a solution of DBTL at 10% in butyl acetate, 26.3 g of butyl acetate, and 5.2 g of methoxy propanol acetate.

The resultant paint is applied with a 100-μm spiral applicator to a 0.7-mm thick degreased chromated aluminum plate.

The test piece is allowed to dry for 48 hours at room temperature which yields a 26-μm thick dry film. The film underwent without change 100 back-and-forth strokes with MEK, exhibited a Persoz hardness of 205s measured according to NFT 30016 and a specular gloss at 60° of 58% measured according to ASTM D 523.85.

The critical surface tension was 32.5 mN/m.

The results of the stain resistance and permanence of effect tests are presented in the following Tables.

Test 11

The same paint as was described in Test 10 was prepared, but drying was performed in an oven at 80° C. for 30 minutes.

The resultant 26-μm thick dry film underwent without change 100 back-and-forth strokes with MEK, exhibited a specular gloss at 60° of 69% measured according to ASTM D 523-85 and a Persoz hardness of 215 s measured according to NFT 30016. The critical surface tension was 32.5 mN/m. The results of the stain resistance and permanence of effect tests are presented in the following Tables.

EXAMPLE 4

Into a 3.3-liter autoclave equipped with effective agitation are introduced after degassing under vacuum: 2 liters of tertiobutanol, 30 g of 3-allyloxy-1,2-propanediol and 30 g of fluorinated monomer of formula $C_8F_{17}C_2H_4-O-CH_2-CH=CH_2$. The temperature in the autoclave is brought to 70° C. at which temperature is added 215 g of $C_2H_2F_2$, 84 g of $C_2F_4$ and then 5 g of tertiobutyl perpivalate. The pressure is 20 bars.

Copolymerization is manifested by a drop is pressure which is compensated for by the addition of a mixture of $C_2H_2F_2$ and $C_2F_4$ in the molar proportion of 65/35. Each time that 46 g of the aforementioned monomer mixture is introduced, there is also introduced 5.5 g of 3-allyloxy-1,2-propanediol and 5.5 g of the compound of formula $C_8F_{17}C_2H_4-O-CH_2-CH=CH_2$. After 3 hours of polymerization, 8 g of tertiobutyl perpivalate is introduced to accelerate the copolymerization kinetics After 5 hours 30 minutes, a total of 44 g of 3-allyloxy-1,2-propanediol, 44 g of the monomer of formula $C_8F_{17}C_2H_4-O-CH_2-CH=CH_2$ as well as 414 g of the 65/35 molar mixture of $C_2H_2F_2/C_2F_4$ monomers have been introduced.

The autoclave is cooled, the residual monomers are degassed and the content of the autoclave is distilled under vacuum. There is recovered 456 g of copolymer which is dissolved in butyl acetate. After washing with water, the copolymer solution is brought to 52% of dry extract The copolymer is subjected to chemical determination of the hydroxy functions in a pyridine/phthalic anhydride medium as described above. The determination yielded an OH level of 1.70 meq/g.

Fluorine 19 NMR analysis showed the molar composition of the copolymer to be the following:

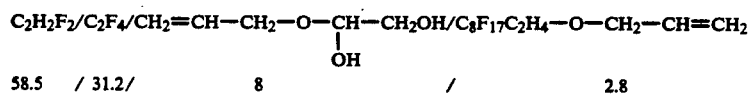

$$C_2H_2F_2/C_2F_4/CH_2=CH-CH_2-O-\underset{\underset{OH}{|}}{CH}-CH_2OH/C_8F_{17}C_2H_4-O-CH_2-CH=CH_2$$

58.5 / 31.2 / 8 / 2.8

The inherent viscosity of the copolymer in solution in dimethylformamide at 25° C. at a concentration of 1 dL was 0.18 dL/g.

Test 12

One hundred grams of the aforementioned copolymer solution are mixed with 17.4 g of a trimer of hexamethylene diisocyanate and 2.2 g of a solution of DBTL at 10% in butyl acetate. The viscosity is adjusted with 5.2 g of methoxy propanol acetate.

The resultant varnish is applied with a 100-μm spiral applicator on a 0.7-mm thick degreased chromated aluminum plate.

The test piece is allowed to dry for 48 hours at room temperature which yields a 21-μm thick dry film. The film underwent without change 100 back-and-forth strokes with MEK. It exhibited a Persoz hardness of 212s measured according to NFT 30-016 and a specular gloss at 60° of 60% measured according to ASTM D 523-85. The critical surface tension was 31.5 mN/M.

The results of the stain resistance testing are presented in the following Tables.

Test 13

The ground base is prepared by dispersing for 30 minutes at 1,500 rpm 97.2 g of titanium dioxide with 194.4 g of the aforementioned copolymer solution and 20 g of methoxy propanol acetate.

To 233.7 g of this white ground base are added 4.2 of the aforementioned copolymer solution, 26.1 g of a trimer of hexamethylene diisocyanate, 0.8 g of a solution of DBTL at 10% in butyl acetate and 12 g of butyl acetate.

The resultant paint is applied with a 100-μm spiral applicator to a 0.7-mm thick degreased chromated aluminum plate.

The test piece is dried in an oven at 80° C. for 30 minutes. The resultant 21-μm thick dry film underwent

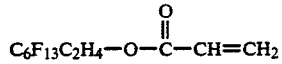

After 3 hours of polymerization, 12 g of tertiobutyl perpivalate is introduced to accelerate the copolymerization kinetics After 6 hours, a total of 40 g of trimethylol propane monoallyl ether, 37.5 g of the monomer of formula:

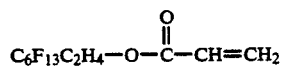

as well as 368 g of the 65/35 molar mixture of $C_2H_2F_2/C_2F_4$ monomers have been introduced.

The autoclave is cooled, the residual monomers are degassed and the content of the autoclave is distilled under vacuum. There is recovered 371 g of copolymer which is dissolved in butyl acetate. After washing with water, the copolymer solution is brought to 60% of dry extract.

The copolymer is subjected to chemical determination of the hydroxy functions in a pyridine/phthalic anhydride medium as described above. The determination yielded on OH level of 1.36 meq/g.

Fluorine 19 NMR analysis showed the molar composition of the copolymer to be the following:

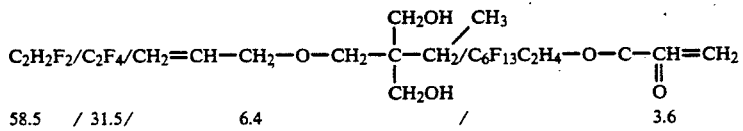

without change 100 back-and-forth strokes with MEK, exhibited a Persoz hardness of 225s measured according to NFT 30016 and a specular gloss at 60° of 55% measured according to ASTM D 523-85. The critical surface tension was 32.5 mN/m. The results of the stain resistance and permanence of effect tests are presented in the following Tables.

EXAMPLE 5

Into a 3.3-liter autoclave equipped with effective agitation are introduced after degassing under vacuum: 2 liters of tertiobutanol, 22 g of trimethylol propane monoallyl ether and 30 g of fluorinated monomer of formula:

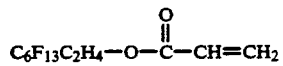

The temperature in the autoclave is brought to 70° C. at which temperature is added 215 g of $C_2H_2F_2$, 84 g of $C_2F_4$ and then 5 g of tertiobutyl perpivalate. The pressure is 20 bars. Copolymerization is manifested by a drop in pressure which is compensated for by the addition of a mixture of $C_2H_2F_2$ and $C_2F_4$ in the molar proportion of 65/35.

Each time that 46 g of the aforementioned monomer mixture is introduced, there is also introduced 8 g of trimethylol propane monoallyl ether and 7.5 g of the compound of formula:

The inherent viscosity of the copolymer in solution in dimethylformamide at 25° C. at a concentration of 1 g/dL was 0.18 dL/g.

Test 14

120 g of the aforementioned copolymer solution is mixed with 20 g of an etherified melamine-formaldehyde resin at 90% in isobutanol, 10 g of xylene and 0.3 g of para-toluenesulfonic acid. The resultant varnish is applied with a 100-μm spiral applicator a 0.7-mm thick degreased chromated aluminum plate.

The test piece is dried in an oven at 145° C. for 30 minutes which yields a 22-μm thick dry film. The film underwent without change 100 back-and-forth strokes with methyl ethyl ketone. It exhibited a Persoz hardness of 225s measured according to NFT 30016 and a specular gloss at 60° of 65% measured according to ASTM D523-85. The critical surface tension was 31.5 mN/m.

The stain resistance results are presented in the following Tables.

Test 15

The ground base is prepared by dispersing for 30 minutes at 1,500 rpm, 106.4 g of titanium dioxide with 177.4 g of the aforementioned copolymer solution and 16 g of methoxy propanol acetate.

To 149.9 g of this white ground based are added 11.3 g of the aforementioned copolymer solution, 16 g of a trimer of hexamethylene diisocyanate, 2.0 g of a solution of DBTL at 10% in butyl acetate and 6 g of butyl acetate.

The resultant paint is applied with a 100-μm spiral applicator to a 0.7-mm thick degreased chromated aluminum.

The test piece is allowed to dry for 48 hours at room temperature which yields a 23-μm thick dry film. The film underwent without change 100 back-and-forth strokes with MEK, exhibited a Persoz hardness of 220s measured according to NFT 30016 and a specular gloss at 60° of 63% measured according to ASTM D 523-85.

The critical surface tension was 32.5 mN/m.

The results of the stain resistance and permanence of effect tests are presented in the following Tables.

EXAMPLE 6

Into a 3.3-liter autoclave equipped with effective agitation are introduced after degassing under vacuum: 2 liters of tertiobutanol, 50 g of 3-allyloxy-1,2-propanediol, 40 g of fluorinated monomer of formula $C_8F_{17}C_2H_4-O-CH_2-CH=CH_2$ and 90 g of butylvinyl ether. The temperature in the autoclave is brought to 70° C. at which temperature is added 280 g of $C_2F_3Cl$, 240 g of $C_2F_4$ and 10 g of tertiobutyl perpivalate. The pressure is 15 bars. Copolymerization is manifested by a drop in pressure which is compensated for by the addition of a mixture of $C_2F_3Cl$ and $C_2F_4$ in the molar proportion of 50/50.

Each time 27 g of the aforementioned monomer mixture is introduced, there is also introduced 4.5 g of 3-allyloxy-1,2-propanediol, 4 g of $C_8F_{17}C_2H_4-O-CH_2CH=CH_2$ and 6.8 g of butylvinyl ether.

After 5 hours, a total of 58.5 g of 3-allyloxy-1,2-propanediol and 52 g of $C_8F_{17}C_2H_4-O-CH_2-CH=CH_2$ as well as 360 g of the 50/50 molar mixture of $C_2F_3Cl/C_2F_4$ and 88 g of butylvinyl ether have been introduced.

The autoclave is cooled, the residual monomers are degassed and the content of the autoclave is distilled under vacuum.

There is recovered 700 g of copolymer which is dissolved in ethyl acetate. After washing with water, the copolymer solution is brought to 65% of dry extract.

The copolymer is subjected to chemical determination of the hydroxy functions in a pyridine/phthalic anhydride medium according to the previously described method. The determination yielded an OH level of 1.05 meq/g.

Fluorine 19 NMR analysis showed the molar composition of the copolymer to be the following:

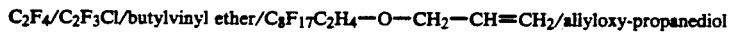

$C_2F_4/C_2F_3Cl$/butylvinyl ether/$C_8F_{17}C_2H_4-O-CH_2-CH=CH_2$/allyloxy-propanediol

31 /31 / 29 / 3 / 6

The inherent viscosity of the copolymer in solution in dimethylformamide at 25° C. at a concentration of 1 g/dL was 0.98 dL/g.

Test 16

One hundred grams of the aforementioned copolymer solution are mixed with 8.0 g of isophorone diisocyanate and 2.3 g of a solution of DBTL at 10% in butyl acetate. The viscosity is adjusted with 15.2 g of methoxy propanol acetate.

The resultant varnish is applied with 100-μm spiral applicator on a 0.7-mm thick degreased chromated aluminum plate.

The test piece is allowed to dry for 48 hours at room temperature which yields a 26-μm thick dry film. The film underwent without change 100 back-and-forth strokes with MEK. It exhibited a Persoz hardness of 230s measured according to NFT 30016 and a specular gloss of 60° of 68% measured according to ASTM D 532-85. The critical surface tension was 31.5 mN/m.

The results of the stain resistance and permanence of effect tests are presented in the following Tables.

Test 17

The ground base is prepared by dispersing for 30 minutes at 1,500 rpm, 110 g of titanium dioxide with 160 g of the aforementioned copolymer solution and 30 g of butyl acetate.

To 150 g of this white ground base are added 20 g of the aforementioned copolymer solution, 13.4 g of a trimer of hexamethylene diisocyanate, 0.5 g of a solution of DBTL at 10% in butyl acetate and 12 g of butyl acetate.

The resultant paint is applied with a 100-μm spiral applicator to a 0.7-mm thick degreased chromated aluminum plate.

The test piece is dried at room temperature for 48 hours. The resultant 26-μm thick dry film underwent without change 100 back-and-forth strokes with MEK, exhibited a Persoz hardness of 240s measured according to NFT 30016 and a specular gloss at 60° of 60% measured according to ASTM D 532-85.

The critical surface tension was 32 mN/m.

The results of the stain resistance and permanence of effect tests are presented in the following Tables.

Test 18

The same paint as described in Test 17 is prepared but the coated plate is dried in an oven for 30 minutes at 80° C.

The resultant 26-μm thick dry film underwent without change 100 back-and-forth strokes with MEK, exhibited a Persoz hardness of 245s measured according to NFT 30016 and a specular gloss at 60° of 65% measured according to ASTM D523-85. The critical surface tension was 32.5 mN/m. The results of the stain resistance and permanence of effect tests are presented in the following tables.

EXAMPLE 7

Into a 3.3-liter autoclave equipped with effective agitation are introduced after degassing under vacuum: 2 liters of tertiobutanol, 50 g of trimethylol propane monoallyl ether, 40 g of fluorinated monomer of formula:

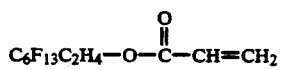

$$C_6F_{13}C_2H_4-O-\underset{\underset{O}{\|}}{C}-CH=CH_2$$

and 75 g of butylvinyl ether.

The temperature in the autoclave is brought to 70° C. at which temperature is added 280 g of $C_2F_3Cl$, 240 g of $C_2F_4$ and 10 g of tertiobutyl perpivalate. The pressure is 15 bars.

Copolymerization is manifested by a drop in pressure which is compensated for by the addition of a mixture of C₂F₃Cl and C₂F₄ in the molar proportion of 50/50.

Each time that 27 g of the aforementioned monomer mixture is introduced, there is also introduced 6 g of trimethylol propane monoallyl ether, 5.4 g of

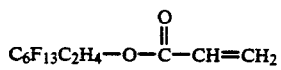

and 5.6 g of butylvinyl ether.

After 5 hours, a total of 78 g of trimethylol propane monoallyl ether, 70 g of

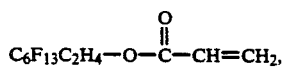

360 g of the 50/50 molar mixture of C₂F₃Cl and C₂F₄, and 74 g of butylvinyl ether have been introduced.

The autoclave is cooled, the residual monomers are degassed and the content of the autoclave is distilled under vacuum.

There is recovered 770 g of copolymer which is dissolved in ethyl acetate. After washing with water, the copolymer solution is brought to 65% of dry extract.

The chemical determination of the hydroxy functions as described above yielded an OH level of 1.5 meq/g.

Fluorine 19 NMR analysis showed the molar composition of the copolymer to be the following:

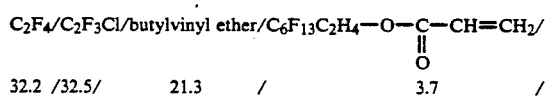

trimethylol propane monoallyl ether 9.3

The inherent viscosity of the copolymer in solution in dimethylformamide at 25° C. at a concentration of 1 g/dL was 0.98 dL/g.

Test 19

One hundred grams of the aforementioned copolymer solution are mixed with 19.2 g of a trimer of hexamethylene diisocyanate and 2.3 g of a solution of DBTL at 10% in butyl acetate. The viscosity is adjusted with 10 g of methoxy propanol acetate.

The resultant varnish is applied with a 100-μm spiral applicator on a 0.7-mm thick degreased chromated aluminum plate. The test piece is dried in an oven at 80° C. for 30 minutes which yields a 22-μm thick dry film. The film underwent without change 100 back-and-forth strokes with MEK, exhibited a Persoz hardness of 207s measured according to NFT 30016 and a specular gloss at 60° of 62% measured according to ASTM D 523-85. The critical surface tension was 30 mN/m. The stain resistance results are represented in the following Tables.

Test 20

The ground base is prepared by dispersing for 30 minutes at 1,500 rpm, 117.8 g of titanium dioxide with 181.4 g of the aforementioned copolymer solution and 20 g of methoxy propanol acetate.

To 59.6 of this white ground base are added 9.4 g of the aforementioned copolymer solution, 19.2 g of a trimer of hexamethylene diisocyanate, 1.8 g of a solution of DBTL at 10% in butyl acetate and 5 g of butyl acetate.

The resultant paint is applied with a 100-μm spiral applicator to a 0.7-mm thick degreased chromated aluminum plate.

The test piece is dried in an oven at 80° C. for 30 minutes which yields a 22-μm thick dry film. The film underwent without change 100 back-and-forth strokes with MEK, exhibited a Persoz hardness of 217s measured according to NFT 30016 and a specular gloss at 60° of 59% measured according to ASTM D523-85. The critical surface tension was 30.5 mN/m.

The results of the stain resistance and permanence of effect tests are presented in the following Tables.

TABLE I

PERMANENCE OF THE STAIN RESISTANT EFFECT FOR AIR-DRIED PAINTS (COLORIMETRIC DEVIATION EVALUATED VIA SPECTROCOLORIMETRY AND EXPRESSED IN MAC ADAM UNITS)

| Test Number | Black felt-tip pen stain | | | Fluorescent pink paint stain | | |
|---|---|---|---|---|---|---|
| | 1st cycle | 2nd cycle | 3rd cycle | 1st cycle | 2nd cycle | 3rd cycle |
| Test 2 (Comp.) | 1.07 | 3.47 | 4.10 | 3.9 | 8.86 | 14.50 |
| Test 4 (Comp.) | 1.32 | 5.45 | 10.33 | 1.46 | 1.39 | 3.88 |
| Test 6 (Comp.) | 0.69 | 1.58 | 8.09 | 1.30 | 1.16 | 1.46 |
| Test 10 | 0.54 | 0.98 | 3.14 | 1.35 | 1.85 | 1.72 |
| Test 15 | 0.42 | 0.79 | 1.67 | 0.85 | 0.98 | 1.07 |
| Test 17 | 0.59 | 1.05 | 3.23 | 1.25 | 1.57 | 1.81 |

TABLE II

PERMANENCE OF THE STAIN RESISTANT EFFECT FOR THE OVEN-DRIED PAINTS (COLORIMETRIC DEVIATION EVALUATED VIA SPECTROCOLORIMETRY AND EXPRESSED IN MAC ADAM UNITS)

| Test Number | Black felt-tip pen stain | | | Fluorescent pink paint stain | | |
|---|---|---|---|---|---|---|
| | 1st cycle | 2nd cycle | 3rd cycle | 1st cycle | 2nd cycle | 3rd cycle |
| Test 3 (Comp.) | 0.40 | 1.63 | 2.06 | 0.31 | 0.84 | 8.17 |
| Test 5 (Comp.) | 1.08 | 2.00 | 3.46 | 0.41 | 0.59 | 2.38 |

TABLE II-continued
PERMANENCE OF THE STAIN RESISTANT EFFECT
FOR THE OVEN-DRIED PAINTS
(COLORIMETRIC DEVIATION EVALUATED VIA
SPECTROCOLORIMETRY AND EXPRESSED IN MAC ADAM UNITS)

| Test Number | Black felt-tip pen stain | | | Fluorescent pink paint stain | | |
|---|---|---|---|---|---|---|
| | 1st cycle | 2nd cycle | 3rd cycle | 1st cycle | 2nd cycle | 3rd cycle |
| Test 7 (Comp.) | 0.45 | 1.20 | 1.87 | 0.23 | 0.17 | 1.54 |
| Test 11 | 0.03 | 0.01 | 0.10 | 0.17 | 0.36 | 1.94 |
| Test 13 | 0.14 | 0.15 | 0.19 | 0.12 | 0.41 | 1.65 |
| Test 18 | 0.12 | 0.15 | 0.07 | 0.13 | 0.40 | 1.70 |
| Test 20 | 0.08 | 0.11 | 0.12 | 0.13 | 0.27 | 0.78 |

TABLE III
STAIN RESISTANCE OF THE AIR-DRIED PAINTS
(COLORIMETRIC DEVIATION EVALUATED VIA
SPECTROCOLORIMETRY AND EXPRESSED IN MAC ADAM UNITS)

| Test Number | Black shoe polish after 1 week | Black felt-tip pen after 1 week | Fluorescent pink spray paint after 1 week |
|---|---|---|---|
| Test 2 (Comp.) | 7.44 | 1.58 | 3.78 |
| Test 4 (Comp.) | 10.96 | 1.77 | 4.31 |
| Test 6 (Comp.) | 9.50 | 0.87 | 1.04 |
| Test 10 | 4.02 | 0.75 | 0.75 |
| Test 15 | 3.56 | 0.39 | 0.52 |
| Test 17 | 4.67 | 0.63 | 0.81 |

TABLE IV
STAIN RESISTANCE OF THE OVEN-DRIED PAINTS
(COLORIMETRIC DEVIATION EVALUATED VIA
SPECTROCOLORIMETRY AND EXPRESSED IN MAC ADAM UNITS)

| Test Number | Black shoe polish after 1 week | Black felt-tip pen after 1 week | Fluorescent pink spray paint after 1 week |
|---|---|---|---|
| Test 3 (Comp.) | 6.53 | 2.44 | 3.44 |
| Test 5 (Comp.) | 5.47 | 2.88 | 0.88 |
| Test 7 (Comp.) | 5.33 | 1.51 | 0.33 |
| Test 11 | 4.14 | 1.45 | 0.67 |
| Test 13 | 2.17 | 0.48 | 0.31 |
| Test 18 | 4.20 | 1.35 | 0.70 |
| Test 20 | 4.07 | 1.46 | 0.73 |

TABLE V
STAIN RESISTANCE OF THE VARNISHES
(COLORIMETRIC DEVIATION EVALUATED VISUALLY)

| Test Number | Black shoe polish after 1 week | Black felt-tip pen after 1 week | Fluorescent pink spray paint after 1 week |
|---|---|---|---|
| Test 1 (Comp.) | 3 | 3 | 4 |
| Test 8 | 2 | 1 | 2 |
| Test 9 | 1 | 0 | 1 |
| Test 12 | 2 | 0 | 1 |
| Test 14 | 1 | 0 | 1 |
| Test 16 | 2 | 1 | 1 |
| Test 19 | 1 | 0 | 1 |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A hardenable copolymer containing copolymerization molecular constituents from a fluorinated monomer and from an allylic monomer, characterized in that:
   (a) the fluorinated monomer molecular constituents originate from the combination of tetrafluoroethylene and at least one other fluorinated monomer selected from chlorotrifluorethylene, vinylidene fluoride, or a mixture thereof,
   (b) the allylic monomer is an allylic polyol of formula:

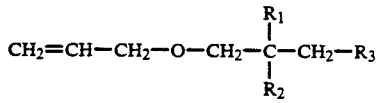

in which $R_1$ is H or $CH_2OH$,
$R_2$ is OH or $CH_2OH$, and
$R_3$ is $CH_3$ or OH,
with the proviso that $R_1$ and $R_3$ cannot be simultaneously H and $CH_3$, and that it contains:
(c) molecular constituents from an allylic or acrylic monomer with a fluorocarbon chain of formula:

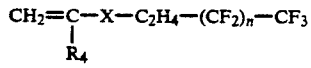

in which n has a value of 3 to 12,
$R_4$ is H or $CH_3$, and

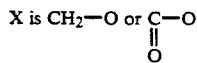

2. The copolymer in accordance with claim 1, characterized in that for each 100 moles of the totality of the copolymerized monomers, its composition is:
(a) 14 to 45 moles of tetrafluoroethylene,
(b) 25 to 81 moles of chlorotrifluoroethylene, vinylidene fluoride, or a mixture of the two,
(c) 4 to 15 moles of allylic polyol, and
(d) 1 to 7 moles of allylic or acrylic fluorocarbon monomer.

3. The copolymer in accordance with claim 2, characterized in that it contains molecular constituents from a nonhydroxylated vinylic ether of formula $CH_2=CH-O-R_5$ in which $R_5$ is a linear or branched chain alkyl radical with 2 to 13 carbons.

4. The copolymer in accordance with claim 3, characterized in that up to 33 moles of nonhydroxylated vinylic ether are introduced into its compositions for each 100 moles of the totality of the monomers necessarily entering into its formulation.

5. The copolymer in accordance with claim 4, characterized in that the ratio between the number of moles of vinylidene fluoride and the sum of the moles of tetrafluorethylene and of chlorotrifluoroethylene is such that:

$$1.5 < \frac{C_2H_2F_2}{C_2F_4 + C_2F_3Cl} < 4$$

6. The copolymer in accordance with claim 4, characterized in that it contains less than 20 moles of $C_2H_2F_2$ and in that in its composition the ratio between the number of moles of $C_2F_4$ and $C_2F_3Cl$ is such that:

$$0.7 < \frac{C_2F_4}{C_2F_3Cl} < 1.5$$

7. The copolymer in accordance with claim 6, characterized in that its inherent viscosity in solution in dimethylformamide at 25° C. at a concentration of 1 g/dL is between 0.06 and 1 dL/g.

8. The copolymer in accordance with claim 7, characterized in that it is in solution in an organic solvent.

9. The copolymer in accordance with claim 8, characterized in that the solvent is an alcohol or an acetate.

10. A stain- and soil-resistant paint or varnish comprising a hardenable fluorinated copolymer in accordance with any one of claims 1 to 7 in solution in a solvent.

* * * * *

UNITED STATES PATENT AND TRADEMARK OFFICE
CERTIFICATE OF CORRECTION

PATENT NO. : 5,136,001
DATED : August 4, 1992
INVENTOR(S) : Kappler, et. al.

It is certified that error appears in the above-indentified patent and that said Letters Patent is hereby corrected as shown below:

Column 7, line 29, and Column 9, line 2, below "Example 1" and "Example 2", in each, insert -- (Comparative) --.

Signed and Sealed this

Seventh Day of September, 1993

Attest:

BRUCE LEHMAN

*Attesting Officer*  *Commissioner of Patents and Trademarks*